United States Patent [19]

Butler et al.

[11] Patent Number: 4,822,058
[45] Date of Patent: Apr. 18, 1989

[54] RADIAL LIP SEAL

[75] Inventors: John D. Butler, Van Wert, Ohio; Jon A. Chandler, Brighton, Mich.

[73] Assignee: Federal-Mogul Corporation, Southfield, Mich.

[21] Appl. No.: 103,151

[22] Filed: Oct. 1, 1987

[51] Int. Cl.$^4$ .................... F16J 15/32; B29C 17/10
[52] U.S. Cl. .................... 277/152; 264/138
[58] Field of Search .......... 264/138, 277; 29/451, 29/460; 384/482–486, 300, 151–153, 147; 277/1, 42, 65, 75, 80, 152, 153, 134, 164, 228

[56] References Cited

U.S. PATENT DOCUMENTS

| | | | |
|---|---|---|---|
| 3,586,342 | 6/1971 | Staab | 277/134 |
| 3,934,888 | 1/1976 | Lutz | 277/134 |
| 4,239,243 | 12/1980 | Bainard et al. | 277/228 X |
| 4,274,641 | 6/1981 | Cather | 277/153 |
| 4,334,687 | 6/1982 | Holzer et al. | 277/151 |
| 4,448,461 | 5/1984 | Otto | 277/152 X |
| 4,464,322 | 8/1984 | Butler | 264/138 |

Primary Examiner—Donald A. Griffin
Attorney, Agent, or Firm—Lawrence J. Shurupoff; Robert F. Hess

[57] ABSTRACT

A radial lip seal (10) having a sealing lip (16) made of first and second materials arranged in alternating regions (20,22) and forming a continuous contact band. The seal is a rotational seal for contacting a shaft or sleeve in a relatively rotatable relationship. The first and second materials have differing physical characteristics to increase hydrodynamic activity at the sealing lip (16). The first material may be a polytetrafluoroethylene material and the second material disclosed may be silicone, fluoroelastomer, nitrile, ethylene acrylic or polyacrylate elastomers. The boundaries (42) between the first and second materials at the contact band preferably intersect the circumferentially extending contact band at an angle. A method of making a radial lip seal is also disclosed wherein an annular wafer (32) of a first material having an undulating circumferential edge (34) with spaced radially recessed portions (36) is placed in a mold (44). A ring (45) of elastomeric material is placed in the mold (44) with the wafer (32). The radial lip seal (10) is then formed by molding the ring (45) of elastomeric material and wafer (32) into the desired seal configuration. The process is completed by forming the sealing lip (16) by cutting the molded wafer (32) and molded elastomeric material contained in the recesses (36) of the wafer (32).

18 Claims, 5 Drawing Sheets

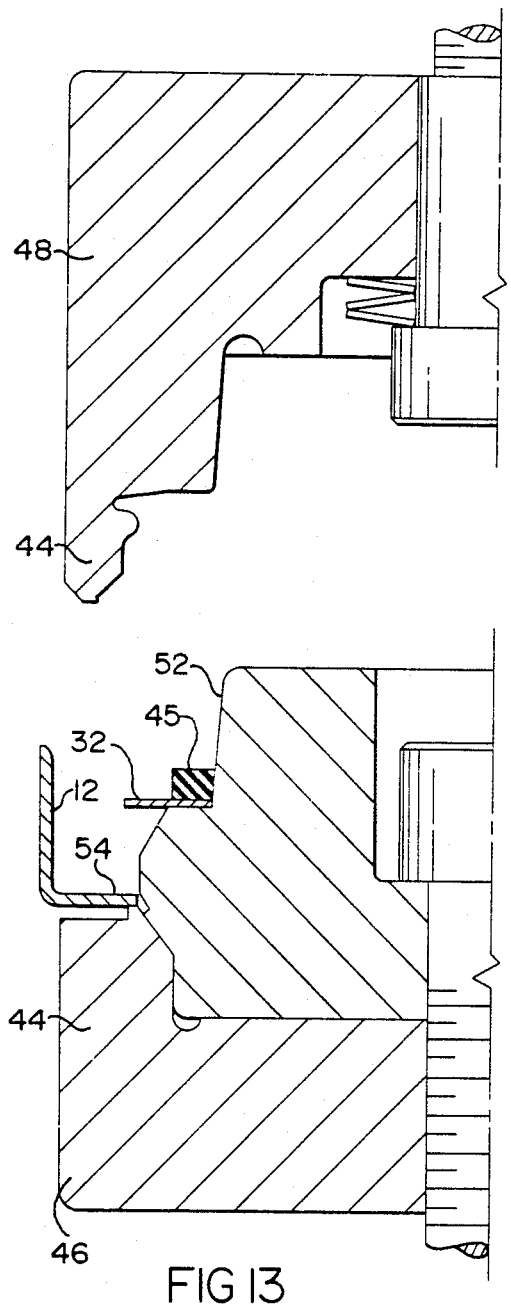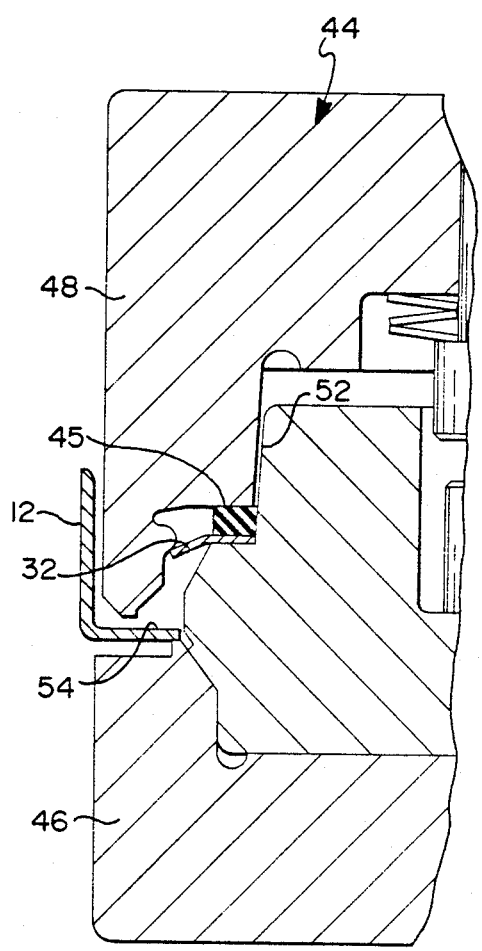
FIG 13
FIG 14

RADIAL LIP SEAL

TECHNICAL FIELD

This invention relates to a radial lip seal for sealing with a relatively rotatable cylindrical member. The invention has particular utility in the automotive and heavy equipment industries for crankshaft seals, transmission seals, and wheel bearing seals.

BACKGROUND ART

Hydrodynamic radial lip seals have been developed to improve performance and durability of rotational contact seals.

Radial lip seals used in relatively rotatable applications are inherently hydrodynamic to a limited extent. Hydrodynamic activity can be increased by incorporating special hydrodynamic aids such as grooves, flutes, ribs or threads adjacent the sealing lip. As seal lips having hydrodynamic aids are rotated, the aids act as small hydrodynamic pumps that direct fluid in contact with the seal lip to the fluid side of the lip. Hydrodynamic elements must be carefully formed and properly installed to be effective.

Hydrodynamic seals are sensitive to eccentricity of the shaft or sleeve. If the seal is eccentric relative to the element against which it seals, hydrodynamic activity may be substantially reduced.

Polytetrafluoroethylene (PTFE) has been proposed as a seal material for rotational contact seals. While hydrodynamic elements may be molded or cut on a PTFE seal lip, frictional wear tends to rapidly neutralize the effect of the hydrodynamic aids.

PTFE wafers are also used as sealing elements by deforming the wafers into a conical configuration. In the conical configuration the PTFE wafer is held with a substantial interference fit against the relatively rotated machine element. PTFE seals having a conical configuration must be carefully installed to prevent scoring the PTFE wafer.

One advantage of PTFE seals is that imperfections in the surface contacted by the seal element may be filled by PTFE being deposited in grooves or indentations. This smooths the surface sealed and tends to improve seal life.

While hydrodynamic seals have improved seal life and performance when properly manufactured and installed, a simple and effective hydrodynamic seal that is easy to manufacture and install has long been needed to permit the use of hydrodynamic seals in conventional and innovative seal applications.

DISCLOSURE OF INVENTION

An object of the present invention is to provide an improved bi-directional hydrodynamic seal that is easy to manufacture and install.

Another object is to provide a durable hydrodynamic seal which features a seal lip providing the benefits of the use of a fluoroelastomer or PTFE material in an alternating array with a second material having different physical characteristics.

The rotational contact seal of the present invention comprises a sealing annulus having a sealing lip which contacts a relatively rotatable shaft or sleeve. Hereinafter, references to the machine element contacted by the seal lip will be simplified by referring to the machine element as a shaft. However, it should be understood that the seal of the present invention may be used as an inner diameter or outer diameter seal. The sealing lip of the seal is formed of first and second materials having different physical characteristics. The first and second materials form a continuous circumferentially extending contact band having alternating first and second regions formed of the first and second materials respectively.

The first and second materials may differ in material characteristics relating to their hardness, coefficient of friction or modulus of elasticity. The first material is preferably PTFE. The second material is preferably an elastomer such as silicone, fluoroelastomer, nitrile, ethylene acrylic or polyacrylate.

The boundaries, or edges, of the first regions between the first and second regions at the seal lip extend at an angle relative to the circumferentially extending contact band. In the preferred embodiment, the boundaries of the first regions between the first and second regions converge radially inwardly from a point on the air side of the contact band to the contact band and diverge radially inwardly from a point on the fluid, or oil, side of the contact band to the contact band.

Shaft oil seals of the present invention preferably include a rigid annular case bonded to a sealing annulus of elastomeric material. The sealing annulus has a sealing lip with a diameter smaller than the inner diameter of the case. An annular wafer used to form part of the sealing lip includes spaced portions between which the elastomeric material of the sealing annulus is deposited. The sealing lip is preferably formed by circumferentially trimming the annular wafer at the recesses providing a continuous sealing lip formed of alternating elastomeric material and PTFE.

The method of the present invention comprises forming an annular wafer of a first material. The annular wafer has an undulating circumferential edge having either spaced radially recessed portions or spaced radially extending portions. The wafer is placed in a mold for forming a seal with a ring of a second material. The wafer and ring are then molded to the desired seal configuration. During the molding operation, the ring of elastomeric material flows into the recessed portions or between radially extending portions of the wafer as the wafer and elastomeric material are bonded together. The seal is completed by circumferentially trimming a sealing lip by alternately cutting the molded wafer and the portion of the second material contained in the recesses or between the radially extending portions of the wafer.

The first material is preferably a PTFE material or the like and the second material is preferably an elastomer. When using a PTFE wafer it is generally necessary to include the further steps of etching the surface of the wafer and applying an adhesive coating to the wafer prior to the molding operation.

The wafer and ring are located within the mold by placing the wafer and ring adjacent to a cylindrical wall of the mold which holds them concentrically in the mold.

The method may also include the step of locating an annular case within the mold when the mold is loaded with the wafer and the ring. The ring is bonded to the annular case during the molding step.

The molding step may also include the step of forming one or more auxiliary lips on the seal spaced from the sealing lip. The auxiliary lip is preferably integrally molded from the second material.

The objects, features and advantages of the present invention are readily apparent from the following detailed description of the best mode for carrying out the invention when read in view of the accompanying drawings.

BRIEF DESCRIPTION OF THE DRAWING

FIG. 13 is a one-half section view of a seal mold loaded with an annular wafer, a ring of elastomeric material, and a case.

FIG. 14 is a fragmentary cross-sectional view of the seal mold of FIG. 13 in the initial phase of the molding operation.

BEST MODE FOR CARRYING OUT THE INVENTION

Figure 1:
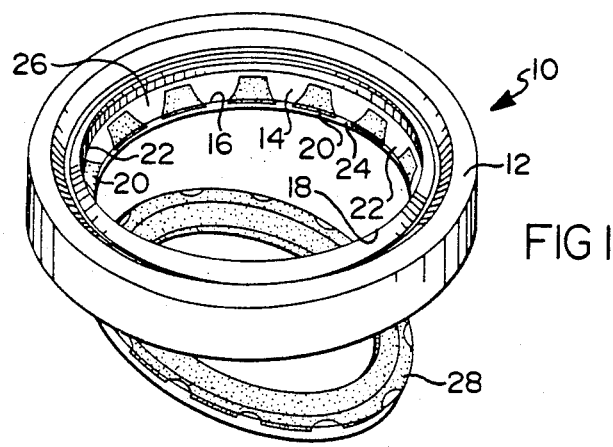
FIG. 1 is a perspective view of a radial lip seal formed in accordance with the present invention.
Figure 2:
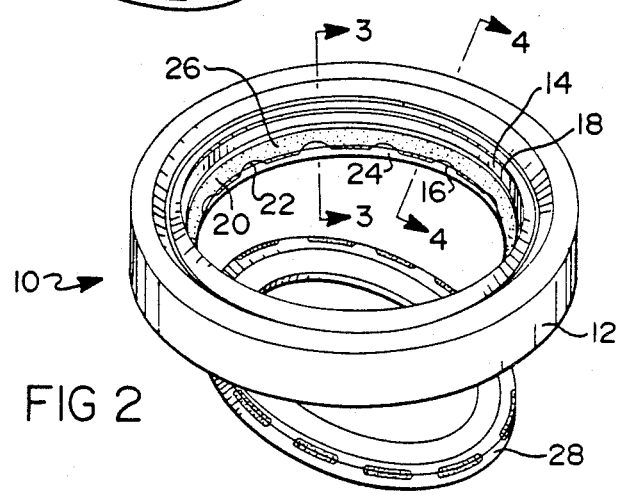
FIG. 2 is a perspective view of a radial lip seal in accordance with the present invention.

Referring now to FIGS. 1 and 2, two different embodiments of the radial lip seal 10 of the present invention are shown. The seal 10 includes a case 12 which is preferably a metal annular member used to support and install the seal. An elastomeric annulus 14 is bonded to the case 12. A sealing lip 16 and an auxiliary lip 18 are formed as part of the elastomeric annulus 14. The sealing lip 16 includes first and second regions 20, 22 formed of first and second materials respectively having different physical characteristics. The sealing lip 16 has a fluid side 24 and an air side 26. The fluid, or oil, side 24 is that side of the sealing lip 16 which faces a fluid reservoir from which the seal is intended to prevent fluid leakage. The air side 26 is that side of the sealing lip 16 from which the fluid contained by the seal is excluded. A waste ring 28, or offal, which is trimmed from the seal 10 after molding is shown in FIGS. 1 and 2 to illustrate how the seal is trimmed to provide a seal having a sealing lip 16 formed of alternating first and second regions 20, 22.

Figure 3:
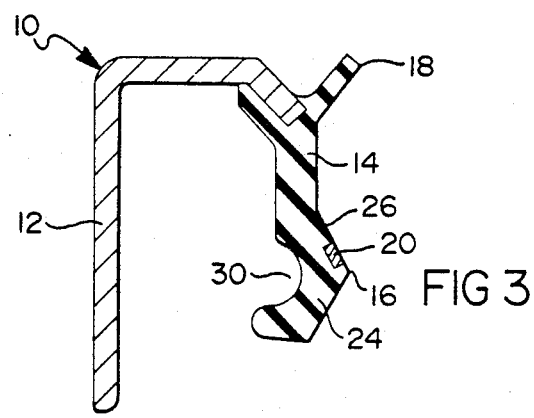
FIG. 3 is a cross-sectional view taken on along the line 3—3 in FIG. 2.
Figure 4:
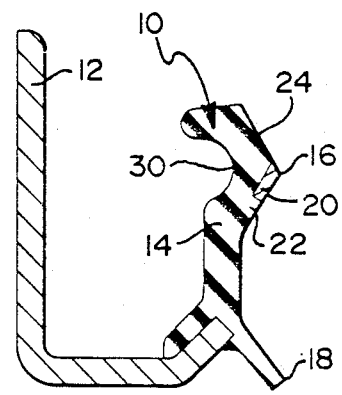
FIG. 4 is a cross-sectional view taken along the line 4—4 in FIG. 2.

Referring now to FIGS. 3 and 4, two cross-sections of the seal 10 are shown to illustrate the structure of the sealing lip 16 as it changes about the inner circumference of the seal. In FIG. 3 the sealing lip 16 is formed of the elastomeric material forming the second region 22. In FIG. 4 the sealing lip 16 is formed of the material forming the first region 20. In FIG. 3 the first region 20 forms no part of the sealing lip 16 on either the fluid side 24 or the air side 26 of the sealing lip 16. In FIG. 4 the first region 20 forms both the fluid side 24 and air side 26 of the sealing lip 16.

A garter spring groove 30 is shown in both FIGS. 3 and 4 radially outwardly spaced from the sealing lip 16. A garter spring, not shown, may be installed in the garter spring groove 30 to provide an inward biasing force on the sealing lip 16 as is well known in the art.

Referring now to FIGS. 5 through 10 different alternative configurations of the wafer used in forming the seal of the present invention are shown. The wafer includes an undulating edge that may form the inner diameter or outer diameter of the wafer. The circular edge 35 of the wafer is adapted to be piloted on a cylindrical surface of the mold used to form the seal. A trim line T is shown in each of FIGS. 5 through 10 in dashed lines to indicate the approximate area that each wafer will be trimmed after molding.

Figure 5:
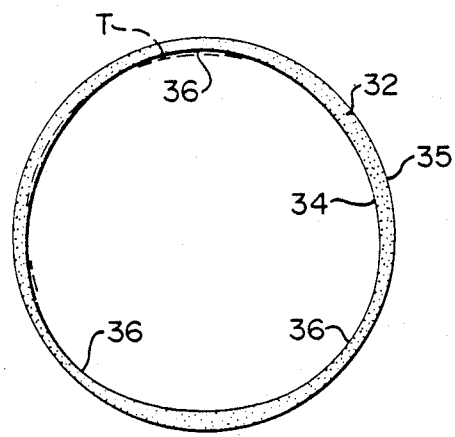
FIGS. 5 through 10 are plan views of annular wafers use in forming radial lip seals in accordance with the present invention.

FIG. 5 shows a wafer ring having an inner diameter undulating edge 34 comprising three recesses 36.

Figure 6:
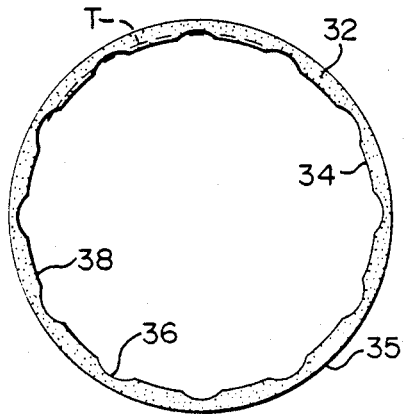

FIG. 6 shows a wafer ring 32 having an inner diameter undulating edge 34 comprising twelve recesses 36. The recesses 36 are distinct and separate crescent shaped recesses separated by protrusions 38 comprising a series of arcuate segments defining a notched circular inner diameter. A seal made with a similarly shaped wafer is illustrated in FIG. 2.

Figure 7:
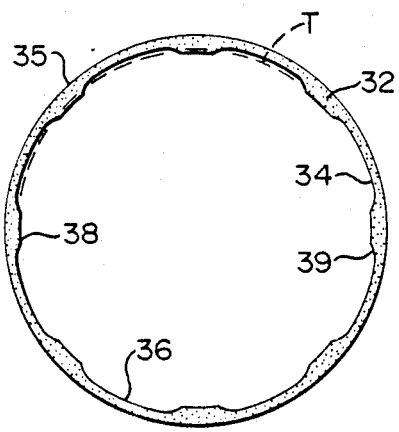

FIG. 7 shows an alternative form of the wafer ring 32 having an inner diameter undulating edge 34. Eight recesses 36 are separated by eight protrusions 38. The protrusions 38 of the illustrated embodiment comprise sections of a circular inner diameter. The recesses 36 define sections of a diameter intermediate the diameter of the protrusion 38 and the outer diameter of the wafer ring 32. Ramp surfaces 39 interconnect the recesses 36 and protrusions 38.

Figure 8:
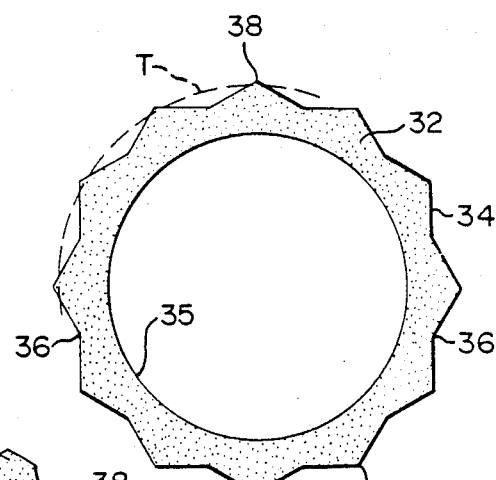

In FIG. 8 a wafer ring 32 having an outer diameter defined by an undulating edge 34 is shown. The recesses 36 are formed by straight line segments intersecting at an oblique angle between adjacent protrusions 38.

Figure 9:
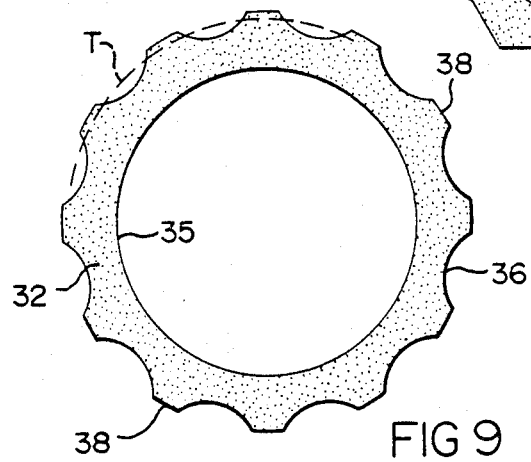

FIG. 9 shows an alternative embodiment of the wafer ring 32 having an outer diameter undulating edge 34. The undulating edge 34 is formed by twelve recesses 36 having a crescent shape. The recesses 36 are spaced about the circumference of the wafer ring 32 by protrusions 38. The seal illustrated in FIG. 1 is representative of a seal made with a similarly shaped wafer ring 32. The first regions 20 in FIG. 1 are trimmed off protrusions 38 of the wafer ring 32.

Figure 10:
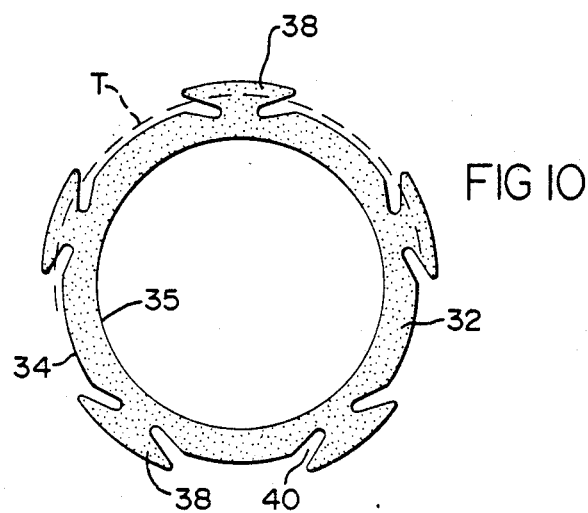

Referring now to FIG. 10, an integrally formed wafer ring 32 is shown which has an outer diameter undulating edge 34 that is specially contoured in the irregular configuration substantially as shown. The undulating edge 34 is formed by five protrusions 38. Slots 40 converge on opposite sides of the protrusions 38 to separate the recesses 36 from the protrusions. This type of wafer ring 32 is shown incorporated in a seal in FIGS. 11 and 12. The wafer ring is trimmed radially outward of the recessed portions 34 so that the protrusions 38 are separated from the ring. Protrusions 38 are left as discrete regions 20 on the finished seal having specially oriented boundaries as described below. This wafer design has produced the best hydrodynamic performance in testing.

Figure 11:
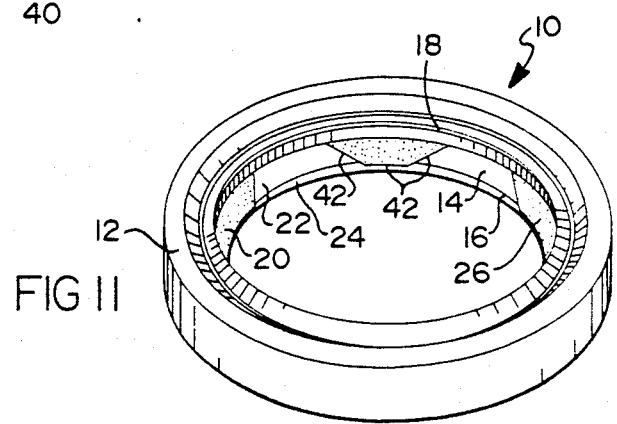
FIG. 11 is a perspective view of a radial lip seal formed in accordance with the present invention.
Figure 12:
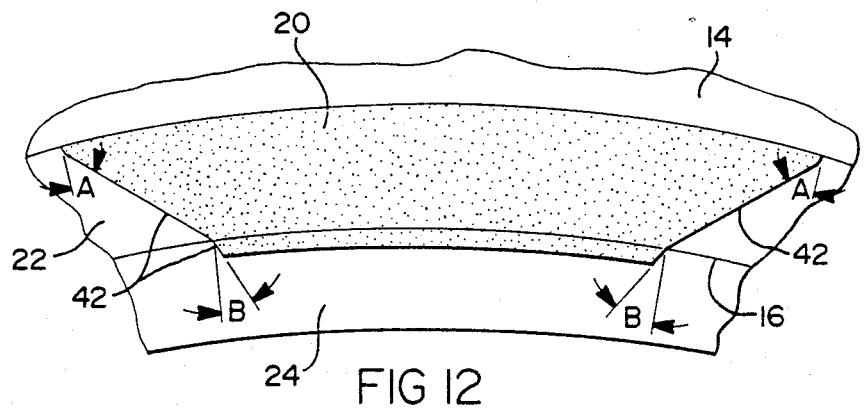
FIG. 12 is a fragmentary perspective view of a portion the sealing lip of a radial lip seal made in accordance with the present invention.

Referring now to FIGS. 11 and 12, the sealing lip 16 of a seal 10 molded in accordance with the present invention is shown in greater detail. The sealing lip 16 includes first and second regions 20 and 22 which are separated by a distinct boundary 42. The boundary 42 is believed to improve the hydrodynamic effect achieved by the seal 10 without the use of grooves or other hydrodynamic aids. The sealing lip 16 is a continuous lip having no conventional hydrodynamic elements that may be worn away. Rotation of the sealing lip 16 relative to a shaft creates the desired hydrodynamic effect.

As best shown in FIG. 12, the boundaries 42 of the first region 20 converge at an angle A relative to a radial line from the air side 26 of the seal to the sealing lip 16. On the fluid side 24 of the sealing lip 16 the boundaries 42 of the first region 20 diverge at an angle B relative to a radial line.

It is believed that the boundary 42, even though formed as a continuous surface, acts as vane which may create a fluid pressure differential for pumping fluid back toward the fluid side of the seal. The difference in the physical characteristics of the materials forming the first region and the second region are believed to improve the hydrodynamic performance of the seal.

The material of the first region 20 may have a lower coefficient of friction, greater hardness, or a lower modulus of elasticity than the second region 22. The difference in hardness or coefficient of friction between the material forming the first region 20 and the second region 22 may create a pressure differential across the boundary.

It has been determined in some instances that the extent that the boundary 42 is angled relative to the sealing lip may enhance or reduce the hydrodynamic effect.

Referring now to FIGS. 13-17, the method of forming a seal 10 in accordance with the present invention will be described in detail. In FIG. 13 a mold 44 is shown with a case 12, wafer ring 32 and a prep ring 45 loaded in the lower half of the mold 44. The prep ring 45 is formed of substantially uncured elastomeric material such as a silicone, polyacrylate, fluoroelastomer, ethylene acrylic, or nitrile elastomer. The wafer ring 32 is preferably formed of PTFE but may also be formed of another fluoroelastomer or natural rubber. It is important that the physical characteristics of the wafer 32 and the prep ring 45 differ from each other. As shown in FIG. 13, the upper half 48 of the mold is disengaged from the lower half 46 for loading.

Referring now to FIG. 14, the molding operation is commenced by moving the upper half 48 of the mold toward the lower half 46. The prep ring 45 and wafer ring 32 are concentrically located upon a cylindrical surface 52 in the lower half 46 of the mold 44. The cylindrical surface 52 keeps the wafer ring 32 and prep ring 45 concentrically located within the mold throughout the molding operation. As the upper half 48 moves towards the lower half 46, the prep ring 45 is contacted by the upper half 48 of the mold 44. The mold 44 is heated to melt and cure the prep ring 45.

Figure 15:
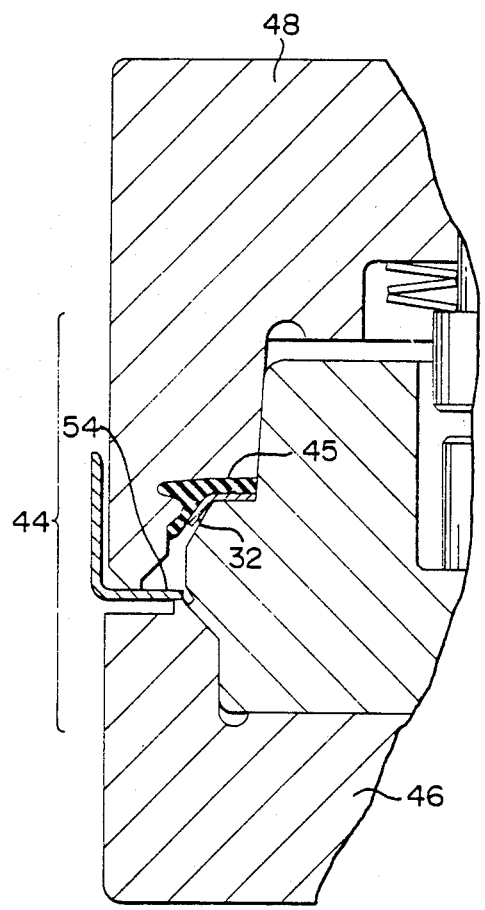
FIG. 15 is a fragmentary cross-sectional view of the seal mold of FIG. 13 as the ring of elastomeric material is formed around the annular wafer.

Referring now to FIG. 15, the prep ring 45 is deformed to fill the mold cavity formed by the upper and lower halves 48, 46. The elastomeric material of the prep ring 45 flows into the recesses 36 of the wafer and throughout the mold cavity.

Figure 16:
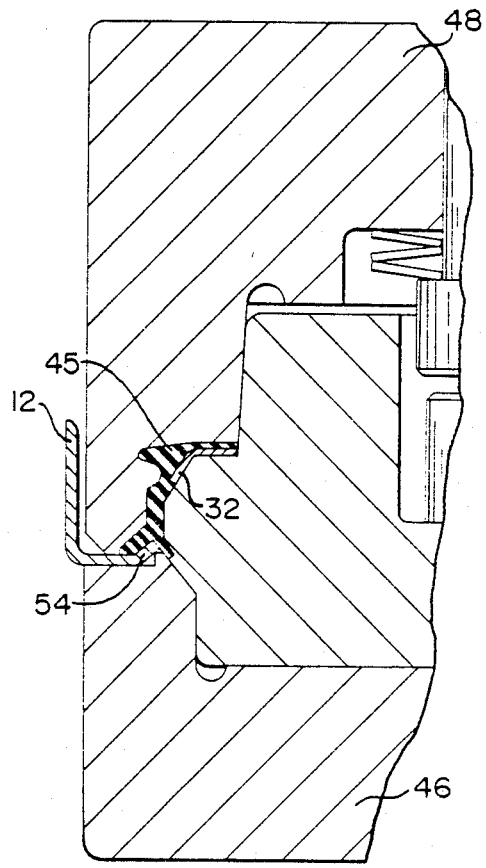
FIG. 16 is a fragmentary cross-sectional view of the seal mold of FIG. 13 showing the seal fully molded.

Referring now to FIG. 16, the molding operation is completed when the elastomeric material of the prep ring 45 completely fills the cavity between the upper and lower halves 44 and the elastomeric material is substantially cured. A flange 54 of the case 12 is preferably cold formed at the inner edge of the case 12 as the mold is closed. The elastomeric material of the prep ring 45 flows around and is bonded to the flange 54 of the case 12. The outer portion of the wafer ring 32 is forced downwardly by the flow of the elastomeric material of the prep ring 45 and formed into a frustoconical shape. One side of the frustoconical portion of the wafer ring 32 may form the air side 26 of the sealing lip 16.

Figure 17:
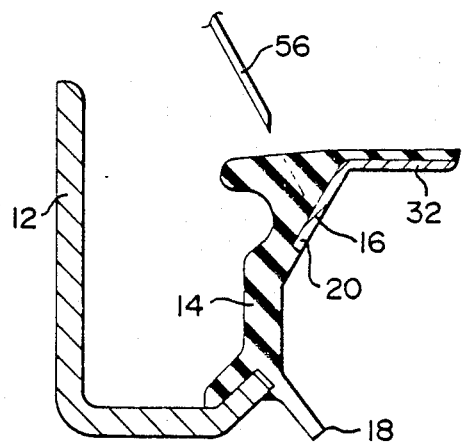
FIG. 17 is a cross-sectional view of a seal with a knife diagrammatically shown illustrating the step of trimming the sealing lip.

Referring now to FIG. 17, the trimming step is illustrated diagrammatically by a knife which trims the seal through the elastomeric material in the recesses of the wafer ring and through the wafer ring 32. A continuous sealing lip 16 is formed by the trimming operation. Sealing lip 16 includes both the first and second regions 20 and 22 in a sequentially alternating pattern. The circular web of the wafer ring 32 may be trimmed off with the waste ring 28 as shown in FIG. 1 or included as part of the air side 26 of the sealing lip 16 as shown in FIG. 2.

While the best mode for carrying out the invention has been described in detail, those familiar with the art to which this invention relates will recognize alternative ways of practicing this invention as defined by the following claims.

What is claimed is:

1. A rotational contact seal comprising:
   an annular sealing member having a lip for contacting a relatively rotatable shaft;
   said lip formed of a first material and a second material, said first and second materials having different material properties and defining a continuous circumferentially extending contact band having alternating first and second separate regions formed of the first and second materials respectively.

2. The rotational contact seal of claim 1 wherein the first material is harder than the second material.

3. The rotational contact seal of claim 1 wherein the first material has a lower coefficient of friction than the second material.

4. The rotational contact seal of claim 1 wherein said first and second regions have distinct boundaries extending at an angle relative to the lip.

5. The rotational contact seal of claim 4 wherein the boundaries of the first region between said first and second regions converge from a point on a non-fluid side of the lip to the lip and diverge from a point on a fluid side of the lip to the lip.

6. The rotational contact seal of claim 5 wherein the first material is polytetrafluoroethylene.

7. The rotational contact seal of claim 5 wherein the second material is selected from the group of elastomers consisting of: silicon, fluoroelastomer, polyacrylate, ethylene acrylic and nitrile.

8. The rotational contact seal of claim 5 wherein said first material has a preselected modulus of elasticity and said second material has a lower modulus of elasticity than said first material.

9. An oil seal comprising:
   an annular case;
   a sealing annulus formed of elastomeric material bonded to an inner diameter of the case, said sealing annulus having a sealing lip formed thereon having a diameter smaller than the inner diameter of the case; and circumferentially spaced portions formed of polytetrafluoroethylene forming part of the sealing lip with the elastomeric material being disposed between the spaced portions to provide a sealing lip formed of alternating elastomeric material and polytetrafluoroethylene material.

10. The rotational contact seal of claim 9 wherein said elastomeric material and polytetrafluoroethylene material have distinct boundaries extending at an angle relative to the sealing lip.

11. The rotational contact seal of claim 10 wherein the boundaries of the polytetrafluoroethylene material between said elastomeric material and said polytetrafluoroethylene material converge from a point on an air side of the sealing lip to the sealing lip and diverge from a point on a fluid side of the sealing lip to the sealing lip.

12. The rotational contact seal of claim 9 wherein the elastomeric material is selected from the group of elastomers consisting of: silicone, fluoroelastomer, ethylene acrylic, polyacrylate and nitrile.

13. A method of making an oil seal comprising:
forming an annular wafer of a first material having an undulating circumferential edge with circumferentially spaced radially recessed portions;
placing said wafer and a ring of a second material in a mold;
molding the wafer and ring to a predetermined shape with the second material flowing into the recessed portions of the wafer;
bonding the first and second materials together; and
trimming a sealing lip by circumferentially cutting the molded wafer and second material contained in the recessed portions.

14. The method of claim 13 wherein said first material is polytetrafluoroethylene and the second material is an elastomer.

15. In the method of claim 14 wherein the step of forming the annular wafer is followed by the steps of:
etching the surface of the wafer; and
applying an adhesive coating to the wafer.

16. The method of claim 13 wherein the wafer and ring are concentrically located by placing said wafer and said ring adjacent a cylindrical wall of the mold.

17. The method of claim 13 further comprising the step of locating a case in the mold with the wafer and the ring and bonding the second material to the case.

18. The method of claim 13 further comprising the step of forming a second lip axially spaced from the sealing lip, said second lip being integrally molded from the second material.

* * * * *